Jan. 31, 1967   LE ROY R. BOGGS   3,301,930
METHOD OF PRODUCTION OF FIBER REINFORCED RESIN ARTICLES
Filed May 6, 1963   2 Sheets-Sheet 2
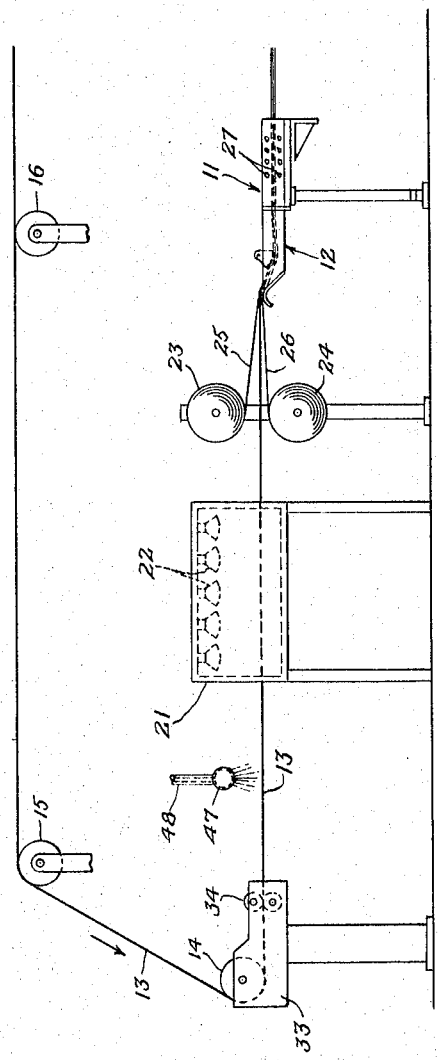
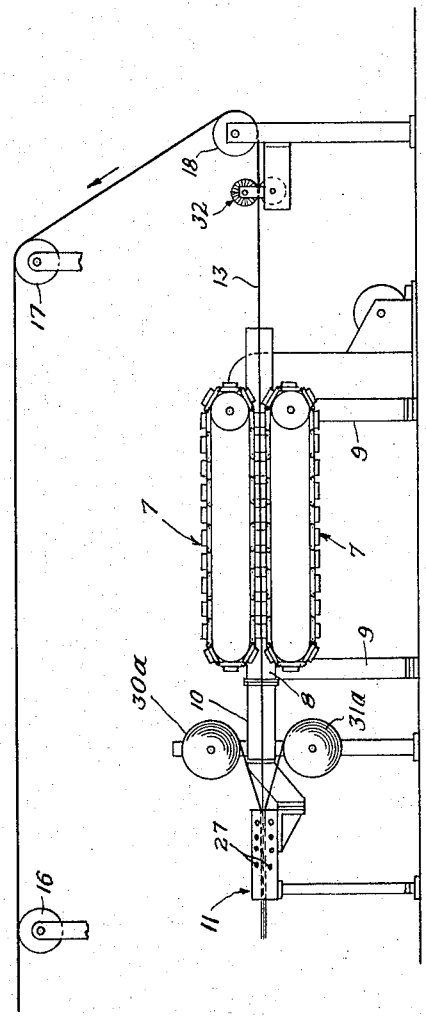
INVENTOR.
Le Roy R. Boggs
BY
ATTORNEYS United States Patent Office 3,301,930
Patented Jan. 31, 1967

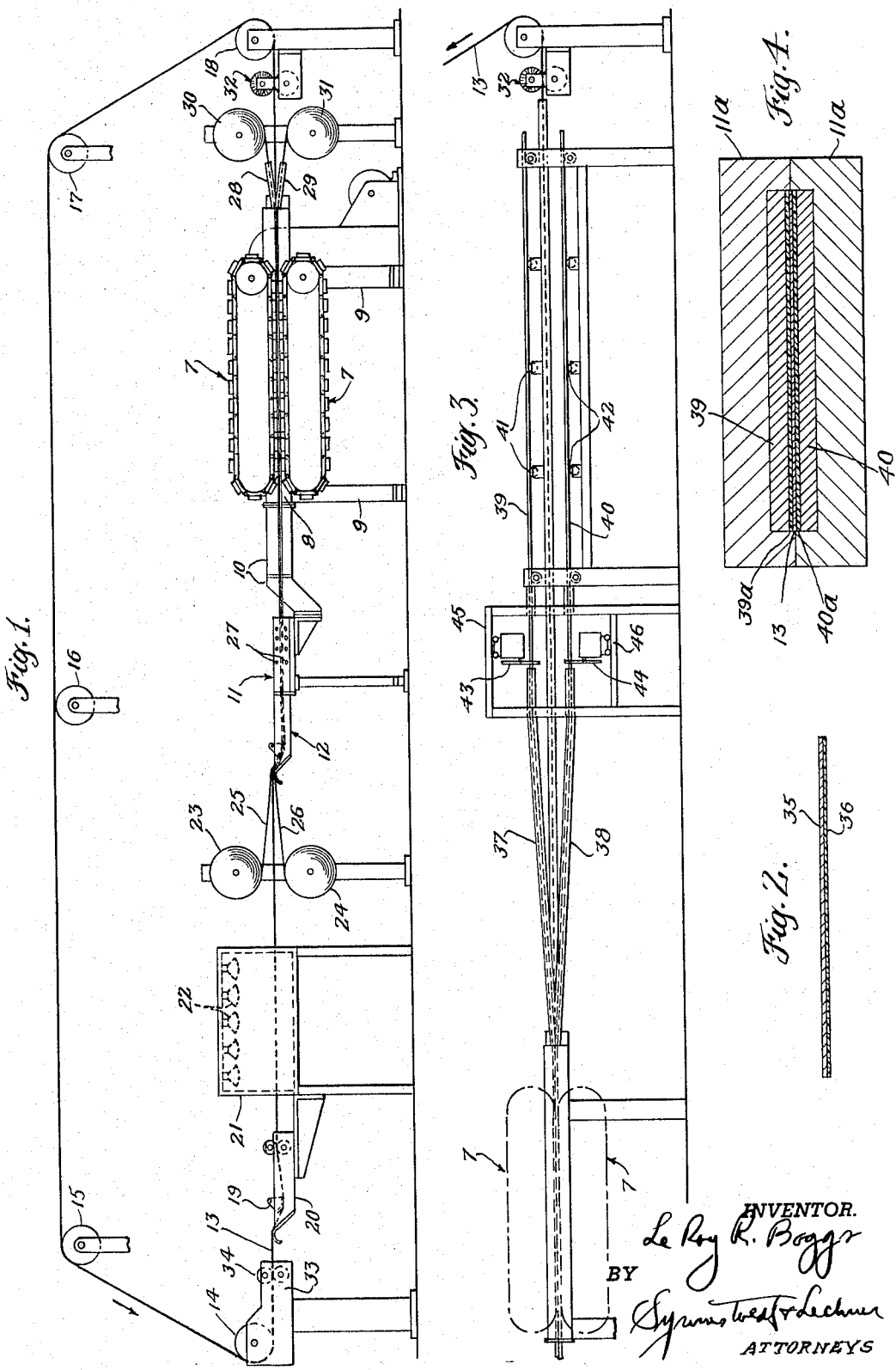

3,301,930
METHOD OF PRODUCTION OF FIBER
REINFORCED RESIN ARTICLES
Le Roy R. Boggs, Bristol, Tenn., assignor to Universal
Moulded Fiber Glass Corp., Bristol, Va., a corporation
of Delaware
Filed May 6, 1963, Ser. No. 278,256
2 Claims. (Cl. 264—137)

The present application is a continuation-in-part of my copending application Serial No. 2,760, filed January 15, 1960, refiled as application Serial No. 408,488 on November 3, 1964, and issued as Patent 3,244,784 on April 5, 1966; of application Serial No. 115,633, filed June 8, 1961; and of application Serial No. 243,862, filed December 11, 1962.

This invention relates to production of fiber reinforced resin articles and the invention is especially concerned with a method and apparatus for producing fiber reinforced resin articles having a resin rich surface.

The invention is especially adapted to the production of articles where the reinforcement comprises glass fiber reinforcement elements, for instance rovings, mats or woven fabrics. While it is advantageous to have the fibrous reinforcement well distributed throughout the section of the article or piece being made, the presence of the fibers of the reinforcement elements immediately at the surface of the piece, for some purposes, has disadvantages, because of the tendency for such fibers at the surface or surfaces of the piece to break or splinter off in fine particles. With such a condition at the surface of the piece, it is difficult to secure a very smooth surface texture, and, in addition, contact of the hands with the surface of the piece sometimes results in the hands picking up fine slivers which are sloughed off the article.

The present invention contemplates a novel method for producing fibrous reinforced resin articles especially glass fiber reinforced resin articles, in which the article has a surface layer of resin material which is free or substantially free of reinforcement fibers. In this way exposure of reinforcement fibers at the surface is avoided and in addition it is possible to obtain a very smooth surface texture and appearance.

The invention contemplates production of pieces or articles having such a resin coated or resin rich surface in a continuous manner, for instance by a technique of the general type disclosed in my copending applications Serial No. 2,760, Serial No. 115,633 and Serial No. 243,862, above referred to.

According to my copending applications Serial Nos. 2,760 and 115,633, fiber reinforcement elements, such as fiber glass mats, are impregnated with a heat hardenable or heat curable liquid resin material and the impregnated reinforcement is then passed through a forming passage in a forming device, heat being applied to the forming device in order to harden or solidify the resin while it is being passed through the forming passage. In the system as disclosed in said prior application, a puller mechanism is arranged to grip the solidified piece beyond the discharge end of the forming passage and to draw the piece being formed through and from the forming device.

In my copending application Serial No. 243,862, a method of the kind just above referred to is also disclosed, but further including the feature of feeding a travelling core or carrier element with the impregnated reinforcement into and through the forming passage. The use of the travelling core or carrier is there disclosed for a number of purposes, including facilitating making pieces of very thin section, and also making pieces having textured or configured surfaces.

According to the present invention it is contemplated to employ a travelling carrier which is fed into the forming passage along with impregnated fiber reinforcement and to utilize such a travelling carrier in a novel manner to develop a resin rich surface on the article being made. This is accomplished according to the present invention by first applying to the travelling carrier a coating of liquid heat curable resin material. This coating is then heated sufficiently to gell the coating, i.e., sufficient to convert the coating from liquid to solid state, although some further hardening will occur by continued application of heat. The carrier with the gelled coating is then fed into the forming passage along wth fiber reinforcement which is also impregnated with liquid heat curable resin, the impregnated reinforcement being in contact with the coated surface of the carrier. The laminated or sandwich structure thus formed is fed through the forming passage to be shaped therein under the confining pressure, to the desired cross sectional shape, and while the sandwich is passing through the forming passage sufficient heat is applied to bond the resin of the gelled coating to the impregnating resin of the fiber reinforcement, the heat further being sufficient to solidify and harden the article thus formed together with its resin rich surface which is represented by the coating which was gelled on the carrier. Finally after emergence from the forming passage the article with its resin rich surface and the carrier itself are separated, this being readily accomplished because of the much greater adherence of the gelled coating to the impregnating resin of the reinforcement than to the surface of the carrier.

How the foregoing is accomplished will appear more fully from the following description referring to the accompanying drawings in which:

FIG. 1 illustrates in somewhat diagrammatic side elevation one preferred form of apparatus according to the invention, this equipment being especially adapted for the production of thin articles, such as thin strip or sheet material;

FIGURE 2 is a cross sectional view illustrating a thin article made in accordance with the method which may be carried out in the apparatus of FIGURE 1;

FIGURE 3 is a view of a modified arrangement particularly adapted to the production of pieces of relatively thick section as compared with those produced in accordance with FIGURES 1 and 2;

FIGURE 4 is a sectional view taken through a forming device such as would be used in association with the apparatus of FIGURE 3, in producing pieces of relatively thick section;

FIGURE 5 is a view similar to the right hand portions of FIGURE 1 and showing another embodiment of equipment according to the present invention; and FIGURE 6 is a view similar to the left hand portions of FIGURE 1 and showing still another embodiment of equipment according to the present invention.

In connection with the following description of the figures of the drawings, it may be mentioned that although various features of the invention are adaptable to the production of pieces from a variety of materials, for instance a variety of types of reinforcement elements and resins, the invention is, for purposes of illustration, described in connection with the production of pieces or articles formed of thermosetting resins such as the well-known polyester laminating resins and fibrous reinforcements comprising glass fibers in the form of rovings, mats containing randomly oriented fibers, or woven glass fiber fabrics, or various combinations of such reinforcement elements. It may be mentioned that the invention is also applicable to the production of a variety of types of articles, particularly various types mentioned in my copending application Serial No. 243,862, above identified. Herein for purposes of illustration the invention is described in connection with the production of strip or sheet type articles.

In FIGURE 1 the reference numerals 7—7 generally designate a pair of crawler tread devices incorporated in a puller mechanism which serves to feed the materials and the articles formed through the system. The crawler treads 7 are yieldingly urged toward each other so as to grip the pieces formed ( and also the carrier device more fully described herebelow) and thus advance the articles by frictional engagement therewith. The details of such a crawler tread mechanism need not be described herein as they form no part of the present invention per se. Such an arrangement is however disclosed in my copending application Serial No. 115,633 mentioned above and also Serial No. 142,749, filed September 18, 1961, the latter now being issued as Patent 3,151,354, October 6, 1964. The mounting frame 8 for the crawler mechanism is mounted by means of standards 9 and the frame is provided with a bracket extension 10 which serves to mount the forming device generally indicated at 11. The forming device in turn carries the resin pan generally indicated at 12 in which the fibrous reinforcements used in producing the articles are impregnated. The details of the arrangement and mounting of a forming device and resin pan as described just above also form no part of the present invention per se, but are disclosed in my copending applications Serial Nos. 115,633 and 243,862.

In accordance with the present invention a carrier or travelling core 13 is used as a means for supporting a coating or layer of resin which is ultimately positioned in the article being formed at the surface thereof, thus representing a resin rich surface on the article. Although such a carrier may comprise a strip which is unwound from a mandrel at the input end of the system and wound up at the output end, in the preferred embodiment as illustrated in FIGURE 1, the carrier takes the form of an endless loop for which support rolls 14, 15, 16, 17 and 18 are provided. As seen toward the left of FIGURE 1, the carrier, which advantageously comprises a web of metal such as stainless steel, is deflected by a guide 19 downwardly into a liquid bath of resin material contained within the resin pan 20, so as to coat both sides of the carried with the resin. The resin here used is advantageously of the same general type as that employed for impregnating the reinforcements in the resin pan 12, for instance a thermosetting polyester laminating type resin which is heat hardenable to the solid or gelled state. From the resin pan 20, the carrier advances into and through an oven 21 heated in any suitable manner, as by electrical heating lamps 22, the heat in the oven being sufficient to convert the liquid resin to the gelled or solid state at both sides of the carrier 13.

Between the oven 21 and the resin pan 12 supply reels 23 and 24 are mounted in position to feed fibrous reinforcement strips 25 and 26 toward the resin pan 12, one above and the other below the carrier 13. The sandwich made up of the strips 25, 26 and 13 then enters the bath of liquid resin in the resin pan 12 and this results in impregnation of the fibrous strips 25 and 26 with the liquid resin. The sandwich then passes directly from the resin bath into the entrance end of the forming passage provided in the forming device 11, such forming passage being of shape conforming with the combined cross sectional shape of the carrier 13 and the two articles to be formed, one above and the other below the carrier. The thickness of the sandwich and the size of the passage in the forming device are such as to provide for compression of the fiber reinforcements against the carrier 13. During the passage of the sandwich through the mid portion of the forming device, heat is applied, as by means of electrical heater elements such as indicated at 27 so as to effect bonding of the gelled coatings in the carrier to the impregnating resin carried by the reinforcement strips, thereby uniting each of the impregnated strips to its adjacent gelled coating on the carrier, and in this way concurrently form two sheet or strip type products.

For reasons fully brought out in my copending applications above identified, the entrance end portion of the forming device 11 is preferably cooled and the entrance end portion of the forming passage is preferably tapered to an enlarged inlet opening, but as these features form no part of the present invention per se, they need not be described in detail herein.

The heating in the forming device and the rate of feed are such that the article emerges from the forming device in solid and quite hard condition, in view of which the crawler treads 7 engage the solidified mass and serve to pull the materials and the articles being formed through the system. After discharge from the puller mechanism, i.e., toward the right in FIGURE 1, the two articles formed are stripped or separated from the carrier 13 by means of guides 28 and 29, the thin articles then being wound or rolled up as indicated at 30 and 31. Periodically new supply rolls 23 and 24 of reinforcement may be substituted and fresh spindles for wind up of the completed strips substituted at 30 and 31.

The carrier, after the articles are stripped therefrom advances further through a cleaning mechanism, for instance a pair of wire brushes 32, after which the carrier passes over the guide rolls 18, 17, 16, 15 and 14, thus returning to the input end of the system. In the preferred embodiment, the carrier is preferably treated to apply thereto a parting compound, such as a wax, prior to feed of the carrier into the resin pan 20. Such a wax in powdered form may be arranged in the container 33 and may be applied to the strip by means of any convenient type of applicator brushes or rolls such as indicated diagrammatically at 34.

According to the foregoing two articles of the type illustrated in FIGURE 2 may be produced, i.e., each comprising a strip 35 carrying at one side thereof a resin rich coating 36 which because of the method of application of the coating is substantially free of fibers and thus may present a very smooth texture and appearance.

In accomplishing the foregoing it is desirable that the heating in the oven 21 be sufficient to gell the resin or render the resin substantially solid, without, however, extending the cure to the ultimate degree of hardness. The gelling or solidification of the resin at this point in the process is important so that when the fiber reinforcements 25 and 26 are brought into contact therewith, the fibers will not penetrate the coating.

It will be noted that in FIGURE 1, the arrangement is adapted to the production of articles of relatively thin section which have adequate flexibility to permit them to be rolled up upon completion as indicated at 30 and 31. In the event of production of pieces of greater thickness or section, it is contemplated that a somewhat different arrangement of handling the completed pieces should be employed. An example of such an arrangement appears in FIGURE 3. Here the same carrier 13 is utilized as in FIGURE 1 and this carrier is handled and treated in the same manner in the early stages of the operation. However upon delivery from the crawler mechanism which is diagrammatically indicated at 7—7 in FIGURE 3, slowly diverging guides 37 and 38 are employed in order to separate the relatively thick articles from the intervening carrier strip 13. Such articles are indicated at 39 and 40 toward the right in FIGURE 3 and it will be seen that the two articles are supported by means of two series of roller supports 41 and 42. Moreover, in FIGURE 3 the articles 39 and 40 are periodically cut off at desired lengths, as by the cut-off discs 43 and 44 movably mounted on tracks 45 and 46, so that the cutter devices may follow the advancing movement of the articles as the lengths thereof are being cut off.

In FIGURE 4 the forming device for use in connection with the arrangement of FIGURE 3 is shown as comprising a pair of forming members 11a—11a having a cavity therebetween to accommodate the central thin carrier 13 and the two articles 39 and 40 being formed. Here it will be seen that the articles are of substantial thickness as compared with the article shown in FIGURE 2 and further that each of the articles 39 and 40 is provided with a resin rich coating 39a and 40a which the articles pick up from the gelled coatings supplied to the carrier 13.

Turning now to the embodiment illustrated in FIGURE 5, all the parts of the system there shown are intended to be the same as described above with reference to FIGURE 1, except for shifting the position of the wind up reels from the position at the discharge end of the puller mechanism 7—7 as shown at 30 and 31 in FIGURE 1, to a position intermediate the discharge end of the forming device 11 and the entrance end of the puller mechanism 7—7 as shown at 30a and 31a in FIGURE 5. Because of the presence of the carrier 13 in the system, the pulling force may, with certain types of products, be supplied by pulling only on the carrier itself, thereby drawing with the carrier through the forming device the articles being formed, which latter, in the case of a thin article may readily be separated from the carrier and wound up at a point in advance of entrance of the carrier into the puller mechanism. The arrangement of FIGURE 5 functions in this manner.

With respect to the embodiment illustrated in FIGURE 6, it is here again noted that the same carrier 13 may be utilized, but instead of coating both sides of the carrier by feed thereof through a liquid resin bath, as in FIGURE 1, a resin coating may be applied to one side of the carrier, for instance the upper side by means of a transversely extended and perforated resin spray pipe 47 supplied by means of a supply pipe 48. This resin coating may then be gelled on the carrier 13 as it passes through the oven 21. As in FIGURE 1 reels 23 and 24 may supply two reinforcement strips 25 and 26 which join the carrier 13 in advance of the resin pan 12.

Since in FIGURE 6 a gelled coating is provided on only one side of the carrier, the two articles formed in accordance with this embodiment will differ from each other in that only one of them will be provided with the resin rich surface, the other having fibrous reinforcement elements dispersed throughout the entire section of the piece even to the surface adjoining the carrier 13.

It will be understood that in the embodiment of FIGURE 6 the portions of the equipment beyond those illustrated in the figure may be the same or similar to those illustrated in FIGURE 1, including the forming device 11, the puller mechanism 7—7, etc.

Although the illustrations of the drawings show only a single reinforcing element being fed so as to form each of the articles being made, it will be understood that different numbers and kinds of reinforcements may be utilized in forming any given article, for instance in the case of producing articles of relatively thick section, more than one mat or strip of fiber reinforcement would be utilized, one being superimposed upon the other to build up the desired thickness and also the desired strength and other characteristics of the product.

I claim:

1. A method for making an article composed of fiber reinforced resin material, comprising applying to both sides of a strip type travelling carrier a coating of heat curable liquid resin material, heating the resin material on the carrier to provide gelled coatings on both sides thereof, impregnating separate fibrous reinforcements with a heat curable liquid resin material, bringing the impregnated reinforcements and the coated carrier together with the reinforcements in contact with the coatings on the carrier, feeding the juxtaposed coated carrier and reinforcements into a forming passage of cross section conforming with that of the carrier taken together with that of the articles being formed, and bonding the resin impregnant of the reinforcements to the resin coatings of the carrier and hardening the resin constituents by heating them during passage thereof through the forming passage.

2. A method for making an article composed of fiber reinforced resin material, comprising applying to one side of a strip type travelling carrier a coating of heat curable liquid resin material, heating the resin material on the carrier to provide a gelled coating thereon, impregnating separate fibrous reinforcements with heat curable liquid resin material, bringing one of said impregnated reinforcements into contact with the coated side of the carrier and bringing the other impregnated reinforcement into contact with the other side of the carrier, feeding the juxtaposed carrier and reinforcements into a forming passage for the article being formed, and heating the resin coating of the carrier and the impregnating resin of the reinforcements during passage thereof through the forming device to effect hardening of all of the resin constituents and bonding of said coating to the impregnated reinforcement in contact therewith.

References Cited by the Examiner

UNITED STATES PATENTS

| | | | |
|---|---|---|---|
| 2,749,266 | 6/1956 | Eldred | 264—137 |
| 2,759,517 | 8/1956 | Marco | 156—501 |
| 2,810,423 | 10/1957 | Longstreth | 156—501 |
| 2,829,571 | 4/1958 | Dunlap | 264—137 |
| 2,871,911 | 2/1959 | Goldsworthy. | |
| 2,965,532 | 12/1960 | Taylor | 156—230 X |
| 3,163,689 | 12/1964 | Ives | 156—231 X |
| 3,185,746 | 5/1965 | Boggs | 264—137 |

ROBERT F. WHITE, *Primary Examiner.*

R. B. MOFFITT, *Assistant Examiner.*